US006429769B1

(12) United States Patent
Fulgueira

(10) Patent No.: US 6,429,769 B1
(45) Date of Patent: Aug. 6, 2002

(54) SECURITY SYSTEM FOR FIREARMS AND METHOD

(76) Inventor: Leonardo Fulgueira, 9456 SW. Scone, Miami, FL (US) 33174

( * ) Notice: Subject to any disclaimer, the term of this patent is extended or adjusted under 35 U.S.C. 154(b) by 0 days.

(21) Appl. No.: 09/665,825

(22) Filed: Sep. 20, 2000

Related U.S. Application Data

(63) Continuation-in-part of application No. 09/016,652, filed on Jan. 30, 1998, now abandoned.

(51) Int. Cl.[7] .................................................. H04B 1/00

(52) U.S. Cl. ..................... 340/5.33; 340/5.54; 340/539; 340/825.69; 340/825.72; 42/70.06; 42/70.11

(58) Field of Search ............................... 340/5.33, 5.54, 340/539, 825.69, 825.72; 49/38, 45; 42/70.06, 70.11

(56) References Cited

U.S. PATENT DOCUMENTS 3,816,755 A * 6/1974 McMaster .................. 340/5.54

* cited by examiner

*Primary Examiner*—Michael Horabik
*Assistant Examiner*—Yves Dalencourt

(74) *Attorney, Agent, or Firm*—Frank L. Kubler

(57) ABSTRACT

A portable security system for protecting a firearm includes a firearm engaging module including a module alarm circuit having a power source, an alarm activation switch, an alarm arming mechanism, a wireless alarm signal transmitter, and a connecting mechanism for connecting the module to the firearm, an alarm monitoring system, and wireless alarm signal relaying device operationally connected to an alarm monitoring system including a telephone link to a monitoring station for alerting appropriate persons when an alarm signal is received from the alarm signal transmitter. The security system preferably additionally includes a panic button alarm signal activation mechanism for causing the transmission of an alarm signal to the alarm signal receiver without displacement of the firearm engaging module. The system further includes wireless alarm signal converting and relaying means located in the vicinity of the gun including a time delay clock to permit user entry of an alarm code to send an alarm deactivation signal to deactivate the alarm before it sounds. The security system preferably still additionally includes an audio alarm sounding device operationally connected to the alarm signal relaying device. The monitoring station is optionally a home security station. The portable firearm is optionally a firearm having a firearm trigger encompassed by a trigger guard, and the connection mechanism includes an engaging mechanism for engaging the trigger guard.

16 Claims, 6 Drawing Sheets

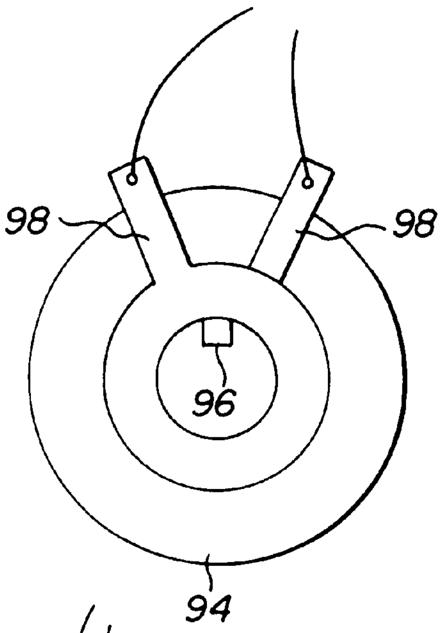
FIG. 3
FIG. 4
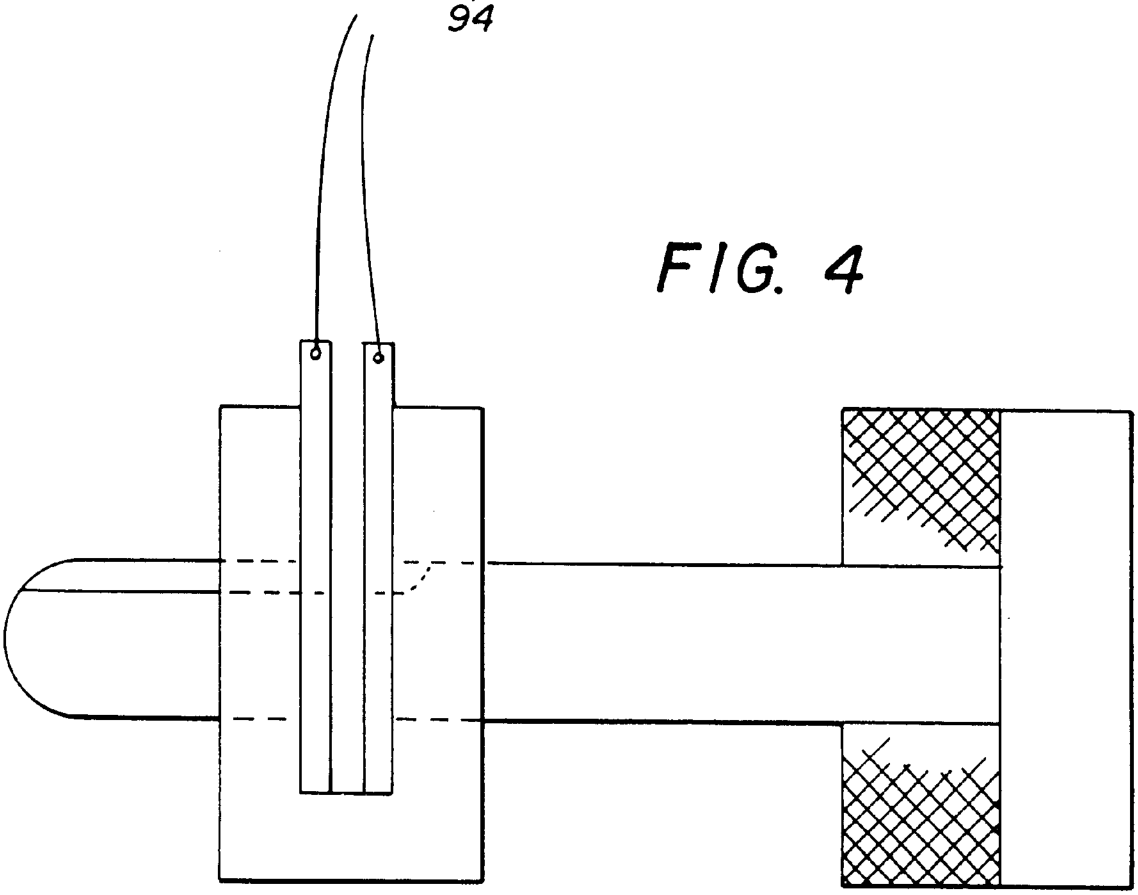

SECURITY SYSTEM FOR FIREARMS AND METHOD

FILING HISTORY

This application is a continuation-in-part of application Ser. No. 09/016,652 filed on Jan. 30, 1998, which is now abandoned.

BACKGROUND OF THE INVENTION

1. Field of the Invention

The present invention relates generally to the field of alarm and security systems for guns. More specifically the present invention relates to a security system for firearms, which are subject to tampering and theft. The system includes a gun module containing a module alarm circuit having a power source, an activation means, arming means, and a wireless alarm signal transmitter which immediately sends a wireless alarm signal, means for locking, mounting to or otherwise engaging the gun to be protected. The system further includes wireless alarm signal converting and relaying means located in the vicinity of the gun including a time delay clock to permit user entry of an alarm code to send an alarm deactivation signal to deactivate the alarm before it sounds. The alarm signal converting and relaying means preferably is operationally connected to an alarm monitoring system having a telephone link to a monitoring station which alerts the owner and summons the appropriate authorities when a signal is received. The alarm monitoring system may additionally or alternatively include a panic button, an audio alarm, and may be a pre-existing house security system or a specially designed committed system. A preferred embodiment of the module is designed for engaging the trigger and trigger guard of a firearm, which lockingly fits through the trigger guard and confines and retains the trigger against pivoting to fire the charge. The preferred alarm activation means is a motion detector or tilt switch. A method of operating the module to engage the trigger guard of a firearm surrounding a trigger and to activate and deactivate the module alarm circuit is provided, including the steps of fitting the trigger connecting means through the trigger guard, locking the connecting means and arming the alarm circuit with the arming means.

2. Description of the Prior Art

There have long been alarm systems for banks, office buildings, houses and automobiles, which either sound an audible alarm or send a signal to an alarm station so that the station staff can call the police, the fire department or source other appropriate authorities. Yet there has been an absence of similar protection for hand portable items such as firearms. The options for securing hand portable items has generally been limited to lockable cabinets and lockable chains and cables passing through the item. Moreover, existing alarm systems having code entry arming and disarming means are vulnerable to short circuiting or outright destruction before a time delay lapses and the alarm signal is sent.

It is thus an object of the present invention to provide a alarm system for firearms.

It is another object of the present invention to provide such an alarm system which, when triggered, immediately sends an alarm signal to a pre-existing or dedicated remote central alarm system from which one or both of the appropriate authorities and the owner are alerted, the central alarm system including a time delay clock for delaying the activation of an alarm and any notification for several seconds so that an authorized user can enter an alarm code and thereby send an alarm deactivation signal to the central alarm system cancelling the alarm before it is sent.

It is still another object of the present invention to provide such an alarm system having a lock which must be disturbed in a way which triggers the alarm to attempt unauthorized removal.

It is a still further object of the present invention to provide such an alarm system which can be connected to a firearm by a lock which prevents discharge of the firearm, the lock being removable by entry of pre-set release code.

It is an additional object of the present invention to provide such an alarm system which is adapted to engage is triggered by picking up or otherwise disturbing the gun.

It is finally an object of the present invention to provide such an alarm system which is reliable, sturdy and easy to install.

SUMMARY OF THE INVENTION

The present invention accomplishes the above-stated objectives, as well as others, as may be determined by a fair reading and interpretation of the entire specification.

A portable security system is provided for protecting a portable item, including an item engaging module including a module alarm circuit having a power source, an alarm activation switch, an alarm arming mechanism, a wireless alarm signal transmitter, and a connecting mechanism for connecting the module to the item, an alarm monitoring system, and wireless alarm signal relaying device operationally connected to an alarm monitoring system including a telephone link to a monitoring station for alerting appropriate persons when an alarm signal is received from the alarm signal transmitter.

The security system preferably additionally includes a panic button alarm signal activation mechanism for causing the transmission of an alarm signal to the alarm signal receiver without displacement of the item engaging module. The security system preferably still additionally includes an audio alarm sounding device operationally connected to the alarm signal relaying device. The monitoring station is optionally a home security station. The portable item is optionally a firearm having a firearm trigger encompassed by a trigger guard, and the connection mechanism includes an engaging mechanism for engaging the trigger guard, including a structure for lockingly and releasibly fitting through the trigger guard and confining and retaining the trigger against pivoting.

Where the portable item is a firearm having a firearm trigger encompassed by a trigger guard, the connection mechanism preferably includes a latching plate having a trigger guard abutting segment with at least one perpendicular cylindrical protrusion for fitting into the trigger guard of the firearm adjacent to the firearm trigger for blocking trigger movement, the latching plate also having a perpendicular engaging segment integral with and bent out of alignment with the guard abutting segment and having a lateral edge with a series of plate locking teeth, a housing containing a guide bore and a sliding plate within the guide bore, the sliding plate having a channel recessed into one plate face with a channel side wall having a series of locking channel teeth, the sliding plate being slidingly mounted into the guide bore within the module housing and abutting a first coil spring at one guide bore end which biases the sliding plate channel teeth into engagement with the plate locking teeth, a lock release button port at the opposing end of the guide bore and a lock release button protruding through the housing and positioned to contact the sliding plate, so that depressing the release button toward the housing against the biasing of the coil spring displaces the sliding plate and thereby disengages the plate teeth from the channel teeth so that the latching plate is freed for removal from the housing and from the trigger guard, and a release button blocking assembly for preventing the release button from displacing the sliding plate.

The release button blocking assembly preferably includes a blocking arm pivotable between, and out from between, the release button and the sliding plate end, and a pivot shaft substantially perpendicular to and connected to the blocking arm on which the pivot shaft pivots, substantially parallel to the sliding plate and the guide box. The security system preferably still additionally includes a tab notch in the sliding plate, a locking tab connected to the pivot shaft so that the locking tab removably fits into the tab notch, a combination lock engagingly and operationally mounted to the pivot shaft and locking tab, and including combination wheels.

The alarm arming mechanism preferably includes an electronic code entry pad, a computer memory for storing a pre-set code, and a microprocessor for comparing an entered code with the pre-set code. The alarm activation switch optionally includes a tilt switch.

A portable security system is further provided for protecting a portable item, including an item engaging module including a module alarm circuit having a power source, an alarm activation switch and alarm arming mechanism, a connecting mechanism for connecting the module to the item, and audio alarm sounding mechanism connected to the alarm activation switch.

A portable security system is further provided for protecting a portable item, including an item engaging module including a module alarm circuit having a power source, an alarm activation switch, alarm arming mechanism, a wireless alarm signal transmitter, and a connecting mechanism for connecting the module to the item, a message storing and sending module, and a wireless alarm signal relaying device operationally connected to the message storing and sending module including a telephone link to a receiving device for alerting a person when an alarm signal is received from the alarm signal transmitter. The receiving device is preferably one of: a pager and a telephone.

A method is provided of operating the item engaging module, including the steps of fitting the trigger connecting mechanism through the trigger guard, connecting the locking mechanism, and arming the alarm circuit with the arming mechanism.

BRIEF DESCRIPTION OF THE DRAWINGS

Various other objects, advantages, and features of the invention will become apparent to those skilled in the art from the following discussion taken in conjunction with the following drawings, in which:

FIG. 3 is an end view of the preferred combination wheel and combination setting radial levers, of a type known generally in the lock making art.

FIG. 4 is a schematic view of the firearm lock.

DETAILED DESCRIPTION OF THE PREFERRED EMBODIMENTS

Figure 1:
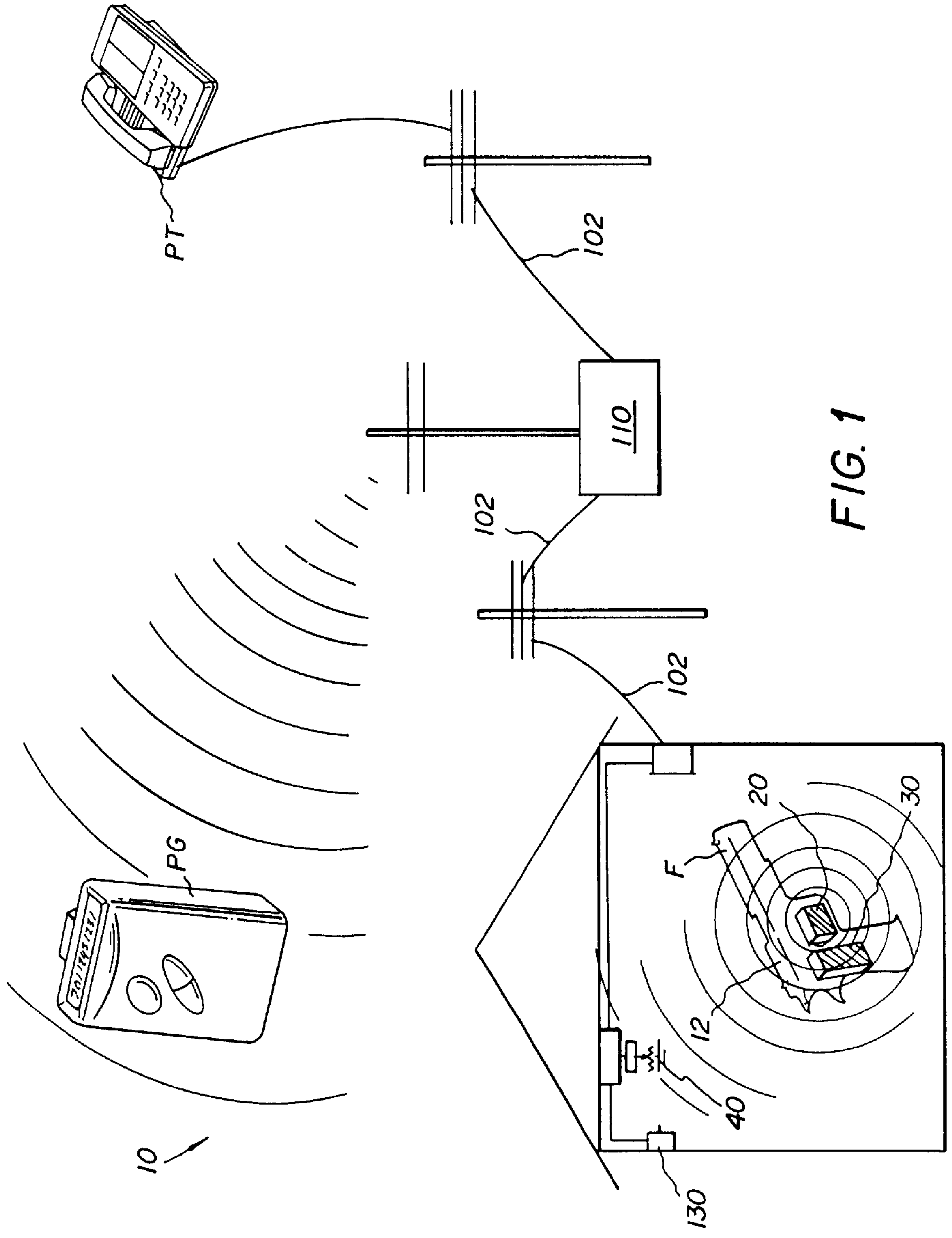
FIG. 1 is an exemplary schematic view of the system of the first preferred embodiment.
Figure 2:
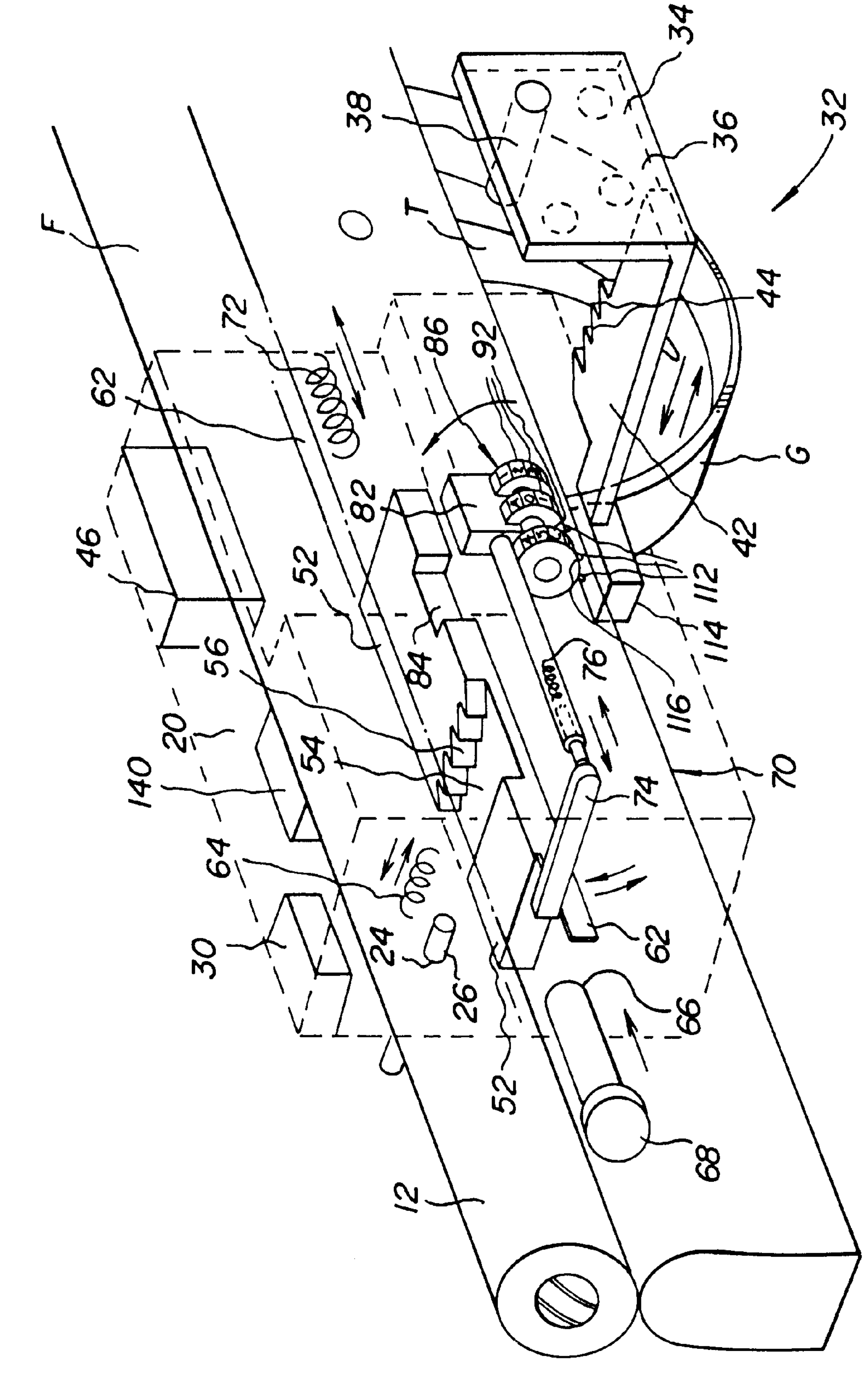
FIG. 2 is a partially schematic perspective representation of the preferred item engaging module fitted to a firearm.
Figure 5:
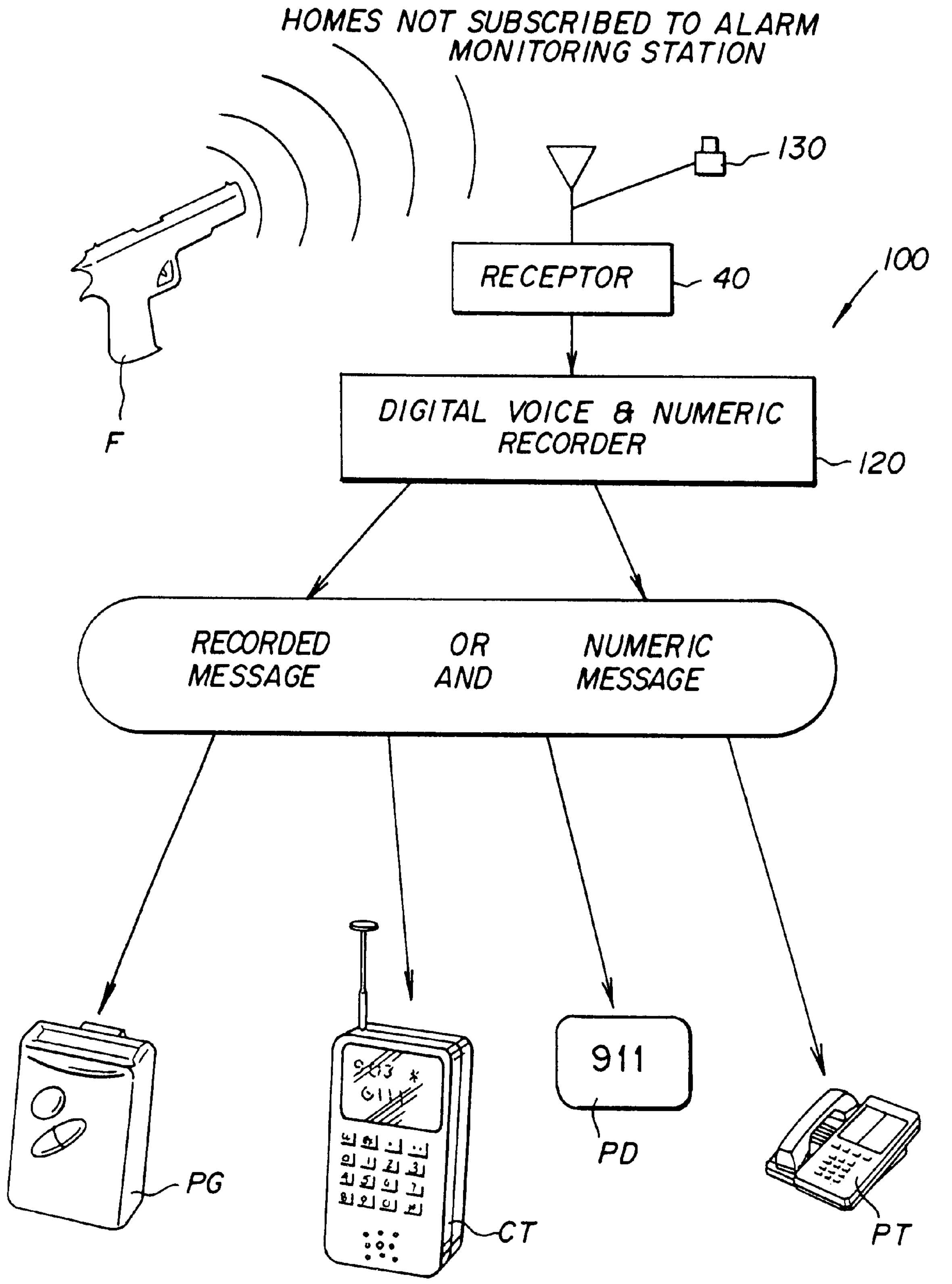
FIG. 5 is an exemplary schematic view of the system of the second preferred embodiment.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

First Preferred Embodiment

Referring to FIGS. 1–7, a security system 10 is disclosed for securing firearms F against tampering and theft. System 10 includes a gun engaging module 20 containing a module alarm circuit 22 having an activation contact switch 24 controlling the flow of electrical power to system 10 elements, arming means 26, a power source 28, a wireless alarm signal transmitter 30 and connecting means 32 for locking, mounting to or otherwise engaging the firearm F to be protected. System 10 further includes a wireless alarm signal converting and relaying means 40 operationally connected to an alarm monitoring network system 100 including a telephone link 102 to a monitoring station 110 from which the owner and the appropriate authorities are alerted when an alarm signal is received. See FIG. 1. The converting and relaying means 40, which is typically within a building where the firearm F is located, receives the wireless alarm signal from alarm signal transmitter 30 and converts it into a telephonic signal and then relays the signal to the alarm monitoring network system 100, using conventional and well-known technology. System 10 additionally or alternatively includes an audio alarm mechanism 50 in module 20, and may be a pre-existing home security system or a specially designed committed system.

A key inventive feature of the present system 10 is the immediate transmission of an alarm signal upon detection of movement of the firearm F by the alarm signal transmitter 30, and the provision of a delay time clock 18 in a remote alarm signal converting and relaying means 40 to give the user time to send a deactivation signal to the converting and relaying means 40 before the alarm signal is relayed and the alarm is sounded or any automatic telephone calls or pages are sent to alert the owner and others of unauthorized use. See FIGS. 6 and 7.

Figure 6:
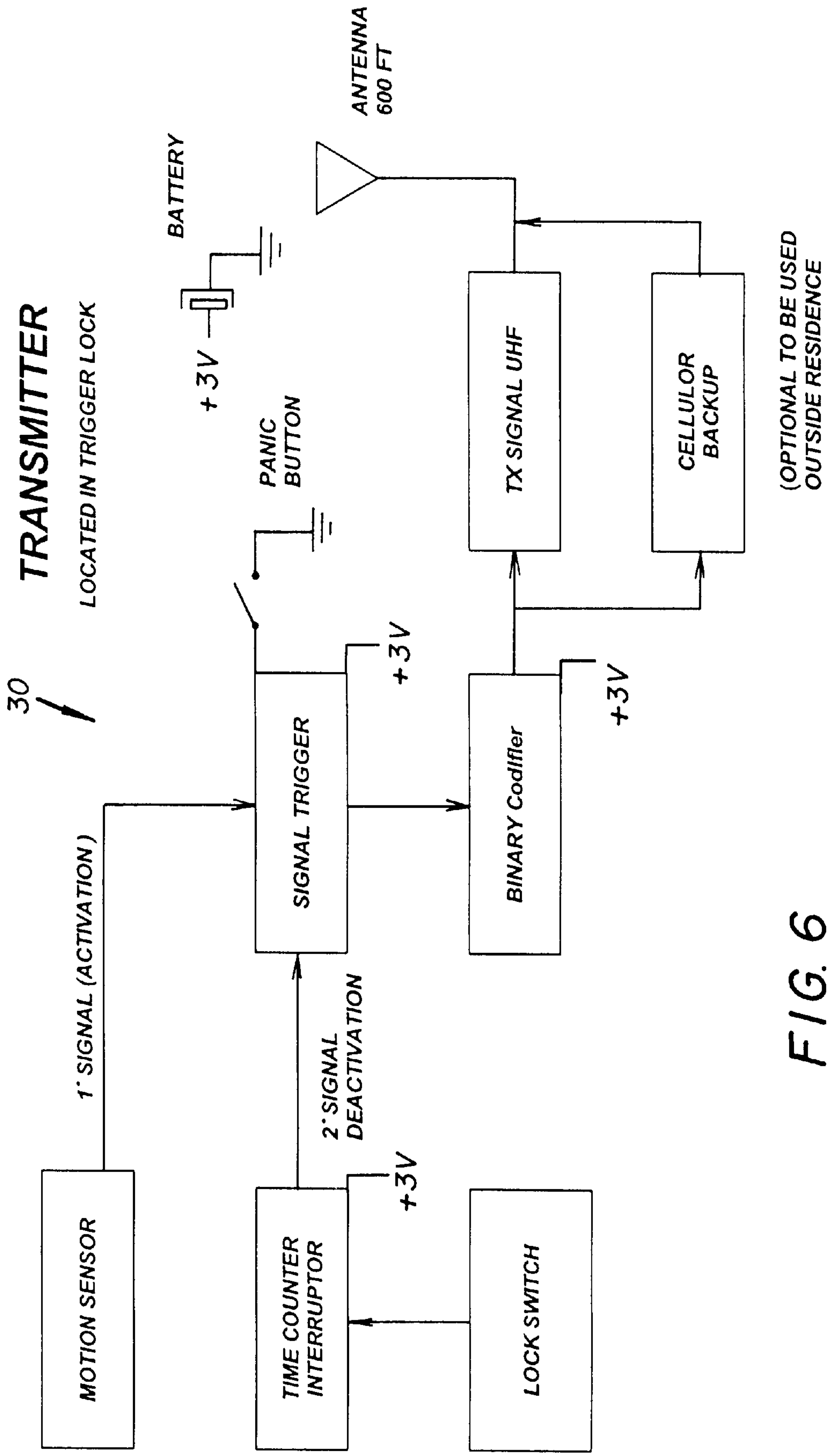
FIG. 6 is a block diagram showing the elements of the alarm signal transmitter, located in the gun trigger lock, and how the elements interrelate.
Figure 7:
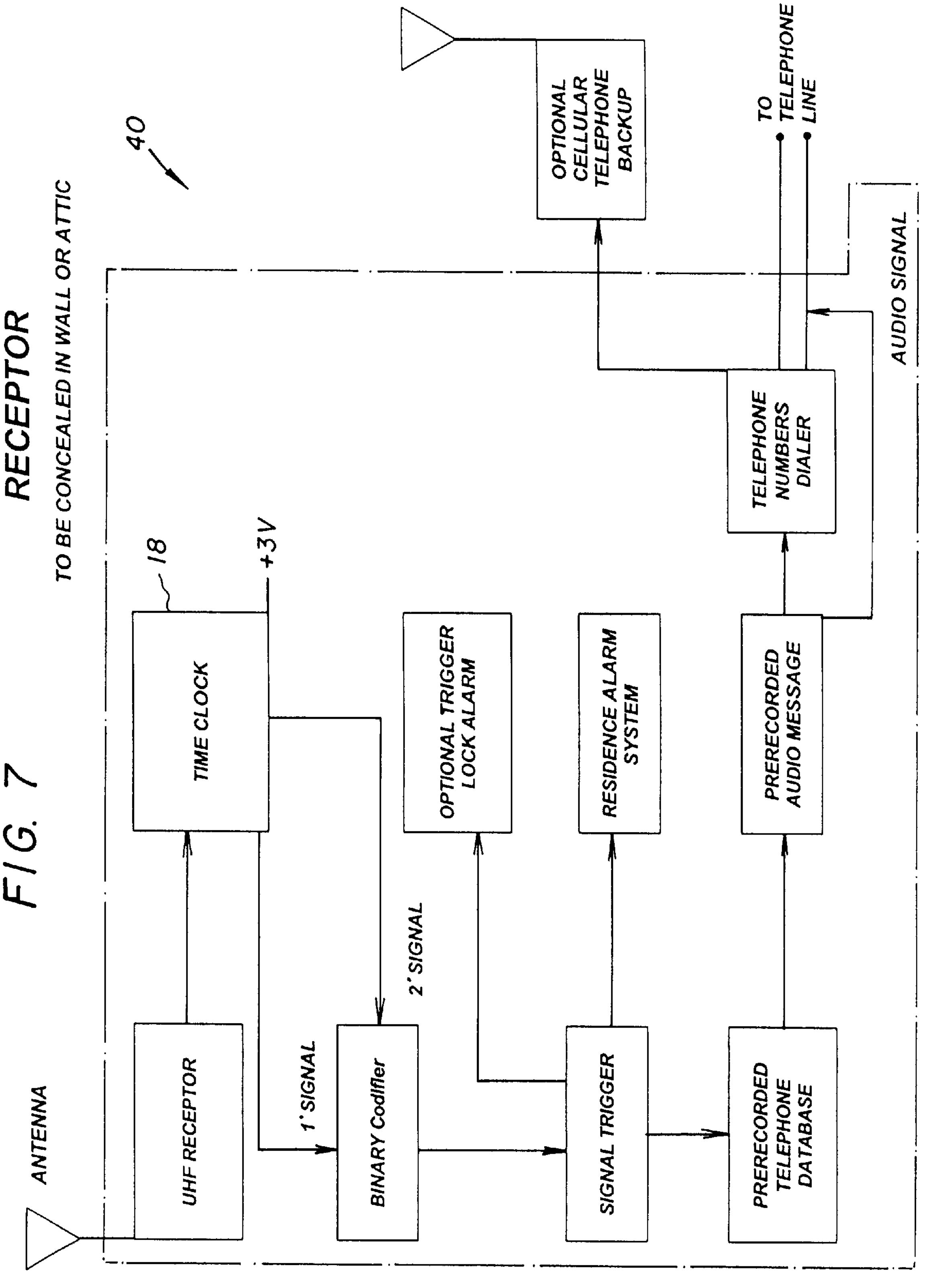
FIG. 7 is a block diagram showing the elements of the alarm signal receiver, including the time clock for delaying arming of the signal transmitter for several seconds so that the user has time to set the gun down in a desired location, and for subsequently delaying alarm activation for several seconds so that the user has time to enter an alarm code to send a deactivation signal.

A block diagram showing the elements of the alarm signal transmitter 30, located in the gun engaging module 20, and how the elements interrelate is provided in FIG. 6. The transmitter 30 sends an alarm activation signal to the signal receiver immediately upon motion detection. As a result, since the signal is already sent, the engaging module 20 effectively is immune from short circuiting or other forms of tampering by an unauthorized user. Shorting out or destroying the module 20 and transmitter 30 cannot un-send the alarm signal, and the failure to transmit an alarm deactivation signal by entering the alarm code at the module 20 assures that an alarm will be sounded, or that interested parties and possibly law enforcement will be notified. A block diagram of the converting and relaying means 40 is provided in FIG. 7 showing its elements, including the time clock 18 for delaying arming of the signal transmitter 30 for a pre-set length of time such as several seconds so that the user has time to set the firearm F down in a desired location, and for delaying alarm activation for a pre-set length of time such as several seconds so that the user has time to enter an alarm code to send a deactivation signal. If the alarm code is not entered in the time allotted following triggering of the system motion sensor or tilt switch within the module 20 and transmission of the alarm signal, however, the converting and relaying means 40 will sound or transmit the alarm, and optionally dial a telephone number to page or play a recorded message to the gun owner and to others.

A preferred embodiment of gun engaging module 20 is designed for engaging a trigger T and trigger guard G of a firearm F, which lockingly but releasibly fits through trigger guard G and confines and retains trigger T against pivoting to fire a charge. The preferred alarm activation contact switch 24 is activated by contact with plate engaging element 42 and includes a motion detector (not shown) or a tilt switch 50. The preferred connecting means 32 includes a latching plate 34 having a trigger guard abutting segment 36 with at least one perpendicular cylindrical protrusion 38 for fitting into the trigger guard G adjacent to the trigger T for blocking trigger T movement. Latching plate 34 also has a perpendicular engaging segment 42 integral with and bent out of alignment with guard abutting segment 36 and having a lateral edge with a series of plate locking teeth 44. The module 20 further includes a housing 46 containing a plate locking element in the form of a sliding plate 52 having a channel 54 recessed into one face with a channel side wall configured into a series of locking channel teeth 56. Sliding plate 52 is slidingly mounted into a guide bore 62 within module housing 46 and abuts a plate ejection spring 64 at one guide bore 62 end which biases sliding plate channel teeth 56 into engagement with the plate locking teeth 44. At the opposing end of guide bore 62 is a lock release button port 66 and release button 68 protruding through the exterior of housing 46 and positioned to contact sliding plate 52, such that depressing the release button 68 toward housing 46 displaces sliding plate 52 against the biasing of plate ejection spring 64. A release button blocking assembly 70 is provided to lock module 20 against unauthorized removal. A plate biasing spring 72 in housing 46 biases the latching plate 34 outwardly from housing 46.

Release button blocking assembly 70 preferably includes a blocking arm 74 which pivots between, and out from between, release button 68 and the sliding plate 52 end. Blocking arm 74 pivots on a perpendicular pivot shaft 76 mounted inside housing 46 parallel to sliding plate 52 and guide bore 62. Pivot shaft 76 is connected to a locking tab 82 which is sized and positioned to releasibly fit into a tab notch 84 in sliding plate 52. A combination lock 86 is engagingly and operationally mounted to pivot shaft 76 and locking tab 82, and includes combination wheels 92 which protrude through wheel openings in a side of module housing 46. See FIG. 2. There are preferably three combination wheels 92, each containing an independently rotatable, sliding tube 94 with an inwardly directed bead 96. Each sliding tube 94 includes a radial lever 98 for repositioning the tube 94 and bead 96 relative to the rest of the wheel 92 to re-set the combination. The general construction of such a combination lock is well known and therefore will not be elaborated upon further here. Alarm arming means 26 preferably includes an electronic code or switch entry pad 104 for activating and deactivating the alarm. Combination wheels 92 preferably each have hidden contacts 112 which pass adjacent to an electronic alarm code reading device 114 containing a code recognizing circuit of conventional design. When the correct code is entered, the contacts 112 are positioned directly adjacent to terminals on the alarm code reading device 114 and the device 114, which is electrically connected to the transmitter 30 causes the transmitter 30 to transmit an alarm deactivation signal to the converting and relaying means 40.

Alarm signal converting and relaying means 40 preferably has a rechargeable back-up battery (not shown), permitting alarm activation for up to 72 hours if electric power is lost. Transmitter power source 28 preferably includes a battery (not shown) which has a shelf life of six months to one year. Transmitter 30 uses very little power since it is only activated when module 20 and firearm F are picked up or otherwise disturbed.

Second Preferred Embodiment

The second preferred embodiment is a system 100 designed for buildings not having a security system which sends a signal to a station 110. See FIG. 5. For this embodiment, the gun engaging module 20 and transmitter 30 are identical to those of the first embodiment. The alarm signal receiver 40 is in this instance operationally connected to a message storing and sending module 120 which in turn is connected to a telephone link 102. A message in the form of a recorded voice or a numerical number is stored in the storing and sending module 120 and alerts the recipient of tampering with the protected firearm F. Upon receiving an alarm signal, alarm signal receiver 40 activates message storing and sending module 120 which dials the number of one or more of: a pager PG, a private telephone PT, a cellular telephone CT or the police department PD, and transmits the message to them.

Additional Features

Both embodiments preferably include a panic button signal transmitter 130 which activates the alarm signal receiver 40 instantly, unlike the gun engaging module 20 which has a built in time delay of several seconds. In this way the user can summon help quickly, such as during a home invasion without alerting the intruder, or upon discovery of a fire or catastrophic health failure. The signal transmitter 130 preferably also includes a global positioning system (GPS) homing device 140 which is remotely activated either automatically or by personnel in an alarm station after an alarm signal is sent and the time delay period has expired without receipt of an alarm deactivation signal.

Both embodiments also present systems 10 and 100 which are modular. One example of this modularity is the ability of the user to take the firearm F with its attached gun engaging module 20 to a location remote from the alarm signal receiver 40, such as where firearm F is a firearm and is taken into the Everglades for practice. In this instance, unauthorized tampering with the secured firearm still sounds the audio alarm and thus alerts the user.

METHOD

In practicing the invention, the following method may be used. A method of operating the module 20 to engage the firearm trigger T and to activate the module alarm circuit 22 is provided, including the steps of fitting the trigger connecting means 32 through the trigger guard G; connecting the locking means 32; arming the alarm circuit 22 with the arming means 26 with a time delay for firearm F placement by the user; causing substantially immediate transmission of an alarm signal to the wireless alarm signal relaying means upon alarm circuit 22 triggering; and delaying alarm generation for a preset length of time. Disengagement of module 20 from firearm F involves a reversal of these steps.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. A portable security system, comprising:

a firearm having a firearm trigger;

a firearm engaging module including connecting means locking said firearm engaging module to said firearm and including a trigger access obstructing structure obstructing access to said firearm trigger and a module alarm circuit having a power source, a motion activated alarm switch activated by combined motion of said firearm and said module, alarm arming means, and a wireless alarm signal transmitter, an alarm monitoring system, and wireless alarm signal relaying means operationally connected to an alarm monitoring system including a telephone link to a monitoring station for alerting appropriate persons when an alarm signal is received from said alarm signal transmitter, said wireless alarm signal relaying means comprising a delay time clock delaying alarm activation for a certain length of time to permit an authorized user of the firearm to enter an alarm code and thereby cause said alarm signal transmitter to transmit a deactivation signal to said wireless alarm signal relaying means to deactivate the alarm.

2. The security system of claim 1, additionally comprising a panic button alarm signal activation means for causing the transmission of an alarm signal to the alarm signal receiver without displacement of the firearm engaging module.

3. The security system of claim 1, additionally comprising audio alarm sounding means operationally connected to said alarm signal relaying means.

4. The security system of claim 1, wherein said monitoring station is a home security station.

5. The security system of claim 1, wherein the firearm has a trigger guard encompassing said firearm trigger, and wherein said connection means comprises engaging means for engaging the trigger guard, including a structure for lockingly and releasibly fitting through the trigger guard and confining and retaining the trigger against pivoting.

6. The security system of claim 5, additionally comprising a release button blocking assembly, comprising:

a sliding plate having a sliding plate end;

a blocking arm pivotable between, and out from between, said release button and said sliding plate end, a guide box;

and a pivot shaft substantially perpendicular to and connected to said blocking arm on which said pivot shaft pivots, substantially parallel to said sliding plate and said guide box.

7. The security system of claim 1, wherein the firearm has a firearm trigger encompassed by a trigger guard, and wherein said connection means comprises:

a latching plate having a trigger guard abutting segment with at least one perpendicular cylindrical protrusion for fitting into the trigger guard of the firearm adjacent to the firearm trigger for blocking trigger movement, said latching plate also having a perpendicular engaging segment integral with and bent out of alignment with the guard abutting segment and having a lateral edge with a series of plate locking teeth, a housing containing a guide bore and a sliding plate within said guide bore, said sliding plate having a channel recessed into one plate face with a channel side wall having a series of locking channel teeth, said sliding plate being slidingly mounted into said guide bore within said module housing and abutting a first coil spring at one guide bore end which biases said sliding plate channel teeth into engagement with said plate locking teeth, a lock release button port at the opposing end of said guide bore and a lock release button protruding through said housing and positioned to contact said sliding plate, such that depressing said release button toward said housing against the biasing of said coil spring displaces said sliding plate and thereby disengages said plate teeth from said channel teeth such that said latching plate is freed for removal from said housing and from the trigger guard, and a release button blocking assembly for preventing said release button from displacing said sliding plate.

8. The security system of claim 6, additionally comprising:

a tab notch in said sliding plate, a locking tab connected to said pivot shaft such that said locking tab removably fits into said tab notch, a combination lock engagingly and operationally mounted to said pivot shaft and locking tab, and including combination wheels.

9. The security system of claim 1, wherein said alarm arming means comprises an electronic code entry pad, memory means for storing a pre-set code, and microprocessor means for comparing an entered code with said pre-set code.

10. The security system of claim 1, wherein said motion activated alarm switch comprises a tilt switch.

11. The security system of claim 1, additionally comprising a global positioning system activating and homing means connected to said module.

12. A method of operating a security system firearm engaging module comprising a trigger access obstructing structure for obstructing operation of said firearm trigger and a module alarm circuit having a power source, a motion activated alarm switch, alarm arming means, a wireless alarm signal transmitter, and connecting means for connecting said module to the firearm; an alarm monitoring system; and wireless alarm signal relaying means operationally connected to an alarm monitoring system including a telephone link to a monitoring station for alerting appropriate persons when an alarm signal is received from said alarm signal transmitter, said wireless alarm signal relaying means comprising a delay time clock delaying alarm activation for a certain length of time to permit an authorized user of the firearm to enter a code and thereby cause said alarm signal transmitter to transmit an alarm deactivation signal to said wireless alarm signal relaying means to deactivate the alarm; comprising the steps of:

locking the module to a firearm having a firearm trigger such that said trigger access obstructing structure obstructs access to said trigger;

arming the alarm circuit with the arming means such that combined movement of said firearm and said module activates said motion alarm switch and thereby activates said alarm circuit to generate an alarm;

causing substantially immediate transmission of an alarm signal to said wireless alarm signal relaying means upon alarm circuit triggering.

13. The method of claim 12, comprising the additional step of:

causing alarm generation after passage of the present length of time with said time delay.

14. The method of claim 12, comprising the additional step of:

deactivating the alarm upon receipt of an alarm deactivation signal.

15. A portable security system for protecting a firearm having a firearm trigger, comprising:

a firearm engaging module including a trigger access obstruction structure for obstructing operation of said firearm trigger and a module alarm circuit having a power source, a motion activated alarm switch, alarm arming means, a wireless alarm signal transmitter, and connecting means for connecting said module to the firearm, an alarm monitoring system, and wireless alarm signal relaying means operationally connected to an alarm monitoring system including a telephone link to a monitoring station for alerting appropriate persons when an alarm signal is received from said alarm signal transmitter.

16. A portable security system for protecting a firearm having a firearm trigger, comprising:

a firearm engaging module including connecting means locking said firearm engaging module to the firearm and including a trigger access obstructing structure obstructing operation of the firearm trigger and a module alarm circuit having a power source, a motion activated alarm switch activated by combined motion of the firearm and said module, alarm arming means, and a wireless alarm signal transmitter, an alarm monitoring system, and wireless alarm signal relaying means operationally connected to an alarm monitoring system including a telephone link to a monitoring station for alerting appropriate persons when an alarm signal is received from said alarm signal transmitter, said wireless alarm signal relaying means comprising a delay time clock delaying alarm activation for a certain length of time to permit an authorized user of the firearm to enter an alarm code and thereby cause said alarm signal transmitter to transmit a deactivation signal to said wireless alarm signal relaying means to deactivate the alarm.

* * * * *